United States Patent
Lu et al.

(10) Patent No.: US 10,285,029 B2
(45) Date of Patent: May 7, 2019

(54) DELIVERING A MESSAGE TO A MOBILE DEVICE IN A MOBILE COMMUNICATION NETWORK

(71) Applicant: VODAFONE GMBH, Duesseldorf (DE)

(72) Inventors: Yang Lu, Duesseldorf (DE); Peter Wild, Krefeld (DE); Alexej Kulakov, Duesseldorf (DE); Juergen Caldenhoven, Duesseldorf (DE)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 15/634,052

(22) Filed: Jun. 27, 2017

(65) Prior Publication Data

US 2017/0374492 A1 Dec. 28, 2017

(30) Foreign Application Priority Data

Jun. 27, 2016 (EP) .................................. 16176448

(51) Int. Cl.
*H04W 4/70* (2018.01)
*H04W 8/08* (2009.01)

(52) U.S. Cl.
CPC ............. *H04W 4/70* (2018.02); *H04W 8/08* (2013.01)

(58) Field of Classification Search
CPC .......... H04W 8/02; H04W 8/04; H04W 8/06; H04W 8/08; H04W 4/70; H04W 16/26; H04W 24/04; H04W 68/005; H04W 8/22
See application file for complete search history.

(56) References Cited

U.S. PATENT DOCUMENTS

| | | | |
|---|---|---|---|
| 2010/0323727 A1* | 12/2010 | Russell | H04W 36/385 455/466 |
| 2012/0157050 A1 | 6/2012 | Kang et al. | |
| 2012/0202508 A1* | 8/2012 | Toth | H04W 4/00 455/450 |
| 2012/0302229 A1* | 11/2012 | Ronneke | H04L 29/12754 455/422.1 |
| 2012/0307764 A1 | 12/2012 | Zhao et al. | |
| 2014/0162636 A1* | 6/2014 | Cui | H04W 48/20 455/434 |
| 2014/0235285 A1* | 8/2014 | Stojanovski | H04W 4/14 455/466 |
| 2014/0307632 A1* | 10/2014 | Kim | H04W 4/005 370/328 |
| 2015/0131437 A1* | 5/2015 | Kim | H04W 28/0289 370/230 |
| 2015/0296345 A1* | 10/2015 | Iwai | H04W 4/029 455/456.1 |

(Continued)

*Primary Examiner* — Jean A Gelin
(74) *Attorney, Agent, or Firm* — Grossman, Tucker, Perreault & Pfleger, PLLC

(57) ABSTRACT

A method is provided for delivering a message to a mobile device (MTC) in a mobile communication network. Furthermore, a switch center (GMSC) is provided for delivering a message to a mobile device (MTC) in a mobile communication network and to a mobility management entity (MME) for delivering a message to a mobile device (MTC) in a mobile communication network. Moreover, a mobile device (MTC) is provided for receiving a message in a mobile communication network and to a database (HLR/HSS) of the mobile communication network.

9 Claims, 3 Drawing Sheets

(56) References Cited

U.S. PATENT DOCUMENTS

2016/0007138 A1* 1/2016 Palanisamy ............. H04W 4/70
 455/41.2
2017/0238193 A1* 8/2017 Futaki ..................... H04W 4/70
 370/329

* cited by examiner

DELIVERING A MESSAGE TO A MOBILE DEVICE IN A MOBILE COMMUNICATION NETWORK

FIELD

The invention relates to a method for delivering a message to a mobile device in a mobile communication network. Furthermore, the invention relates to a switch center for delivering a message to a mobile device in a mobile communication network and to a mobility management entity for delivering a message to a mobile device in a mobile communication network. Moreover, the invention relates to mobile device for receiving a message in a mobile communication network and to a database of the mobile communication network.

BACKGROUND

In mobile communication networks, significant signaling load can occur during the delivery of messages to mobile devices. The signaling load can in particular occur in the core network of a mobile communication network. The core network is the central part of the mobile communication network that provides various services to mobile devices in particular for the subscribers and users of the mobile devices. The core network is connected to several access networks, which provide access to the mobile communication network for the mobile devices.

When delivering of a message, the message is received at a switch center of the core network. For gathering the needed routing information to deliver the message, the switch center sends an interrogation request to a database of the core network, in which database subscriber information of the subscribers of the mobile communication network are stored. For instance, to deliver the message, the switch center needs to know via which access network the message can be delivered to the mobile device, which is the recipient of the message. Therefore, the database of the core network provides information regarding the entity of an access network, via which the mobile device is connected to the mobile communication network.

The significant load in the core network by these interrogation requests to get the routing information needed by a switch center to deliver a message is based on two factors: the first is the amount of messages to be delivered and the second one is the amount of tries, which are needed for the delivery of the message. The message cannot be delivered via the access network to the mobile device, if for instance the mobile device is turned off or is out of the coverage area of the access network. In this case, the message needs to be redelivered, whereby to get the needed routing information for delivering the message, the switch center of the core network sends another interrogation request to the subscriber database to get the needed information. If a mobile device is for instance turned off for several hours, the switch center tries to redeliver the message in short time intervals so that massive amount of signaling load can occur in the core network.

Given the fact that several million of mobile device are operated in a mobile communication network, the signaling load can be immense.

Regarding the aforementioned prior art it is the technical object of the invention to provide a solution, which reduces the signaling load in a mobile communication network, which is caused by delivering a message to a mobile device in the mobile communication network.

SUMMARY

As a technical solution, a method for delivering a message to a mobile device in a mobile communication network, comprises the following method steps:
  receiving and storing a movement information element indicating if the mobile device is a stationary device by a responsible mobility management entity of the mobile communication network, via which the mobile device has access to the mobile communication network and/ or by a database of the mobile communication network, wherein the database comprises subscriber information of subscribers of the mobile communication network;
  receiving a message to be delivered to the mobile device at a switch center of the mobile communication network;
  checking if the responsible mobility management entity is known by the switch center, and if the responsible mobility management entity is known forwarding the received message together with the movement information element, if the movement information element is available at the switch center, to the responsible mobility management entity, and
  if the responsible mobility management entity is unknown by the switch center, sending an interrogation request from the switch center to the database to acquire the responsible mobility management entity, and acquiring the movement information element of the mobile device if the movement information element is available at the database, and
  after acquiring the responsible mobility management entity, preferably together with the movement information element, forwarding the message and the movement information element, if the movement information element is available at the switch center, from the switch center to the responsible mobility management entity;
  receiving the forwarded message and, if forwarded by the switch center, the movement information element at the responsible mobility management entity;
  checking if the movement information element is available at the responsible mobility management entity, and if the movement information element is not available at the responsible mobility management entity acquiring the movement information element by the responsible mobility management entity and after acquiring the movement information element transmitting the movement information element to the switch center; and
  delivering the message from the responsible mobility management entity to the mobile device if the mobile device is reachable or, if the mobile device is not reachable and the mobile device is a stationary device, storing the message by the responsible mobility management entity and delivering the stored message upon the mobile device is waking up from the responsible mobility management entity to the mobile device.

A "communication system" comprises a mobile device, a mobile communication network, a switch center, a mobility management entity and a database.

A "mobile device" can be a mobile phone, smart phone, tablet or preferably a M2M (M2M: Machine to Machine) device, for instance a MTC (MTC: Machine Type Communication) device, capable of connecting to an access network of a mobile communication network. In particular the mobile device is capable of connecting to the mobile communication via radio access networks. The mobile device can be used for M2M-communications in mobile communication networks.

A "mobile communication network" can in particular be a network according to 2G-, 3G- and/or LTE (3GPP)-standards or future standards like for instance so called 5G-standard. The mobile communication network can be defined to provide a core network, which comprises entities such as a database, for instance HLR (HLR: Home Location Register), HSS (HSS: Home Subscriber Server), VLR (VLR: Visitor Location Register) as well as service entities such as MSC (MSC: Mobile Switching Center), SMSC (SMSC: Short Message Service Center) or the like used in future standards, in the following referred to as switch center, GMSC (GMSC: Generic Switch Center).

A "mobility management entity" (MME) is an entity of the core network of a mobile communication network, via which a mobile device has access to the mobile communication network. It is connected to the access network of the mobile communication network, which access network is for instance a GRAN, GERAN, UTRAN or an E-UTRAN, also referred to as eNodeB (eNodeB: Evolved Node B). An eNodeB is used as an access network in mobile communication networks according to the LTE-standard.

A "message" to be delivered to a mobile device as used herein is preferably a MT (MT: Mobile Terminated) message, which is a message sent to the mobile device.

As used herein, the term "stationary device" includes devices that are not intended to be carried around by an individual while operating. In various examples, stationary devices are set-top boxes, appliances, mobile devices or M2M devices, MTC devices or other similar devices that are located in a mobile communication network and which do not move around in the communication network.

An "information element" in the sense of the invention is an information and/or data, which is suitable to be used, processed, stored, read or the like by an entity of a mobile communication network.

The term "known" respectively "unknown" as used herein refers to a feature of an entity of a mobile communication network, wherein the entity has already gathered the information respectively information element in the past, for instance the information respectively information element is stored in a database of the entity so that during a method step of checking if that information respectively information element is known the entity of the mobile communication network can look up in the database. If the information element respectively information contains the information element respectively information, the entity "knows" this information element respectively information.

The term "available" as used herein refers to a feature of an entity of a mobile communication network, wherein the entity has access to information element and/or information so that the information element and/or information can be used, for instance stored, sent, forwarded, edited, added to other information element or information by the entity. Access to information element and/or information means that the information or the information elements are already stored for instance in a database to which the entity has access to and/or that the information element and/or the information is received or the like by the entity.

The term "reachable" or "reachability" of a mobile device, as used herein refers to the operation functionality of a mobile device. If a mobile device is not reachable, it can for instance be in a sleep mode to save energy, wherein a communication to the mobile device is not possible, be turned off so that a communication to the mobile device in the mobile communication network is not possible and/or be out of a coverage area of an access network so that a communication to the mobile device is not possible as well.

The term "acquiring" or "acquire" as used herein refers to a feature of an entity of a mobile communication network, whereby an information element and/or an information is made available at the entity by sending a request to another entity of the mobile communication network, whereby the other entity has access to the requested information element and/or information so that the requested information element and/or information can be sent back to the entity from which the request originated. Furthermore, the term "acquiring" or "acquire" of an information element and/or information refers to the feature that the information element and/or information to be acquired is available at the entity, for instance it is already stored in a database or the like so that stored, sent, forwarded, edited, added to other information element or information by the entity.

The invention is based on the knowledge that mobile devices, which are stationary devices will send and/or receive messages respectively data very infrequently. These stationary mobile devices enter a so called sleep mode, wherein the radio is turned off and the mobile device has no access to a mobile communication network. The mobile devices enter the sleep mode in order to achieve a better battery usage and a longer battery usage, for instance to operate for about 10 years with the power of one battery without reloading it. If a message should be delivered to a mobile device, which is not reachable, for instance because it is in the sleep mode, the message cannot be delivered to the mobile device. The switch center, which is responsible for the delivery of the message to the mobile device, requests for every try to deliver the message the routing information needed from a subscriber database of the mobile communication network and after getting the needed routing information, forwards the message to a responsible MME in order to deliver the message to the mobile device. It is very clear that significant signaling load is produced in the mobile network, especially for the core network of the mobile network if several retries for the delivery of a message are executed when the mobile device is not reachable. The re-delivery of the message respectively data is executed automatically after a certain time period. The re-delivery of the message might fail again if the mobile device is still not reachable.

Furthermore, the invention is based on the knowledge that only a responsible MME of the core network of the mobile communication network may acquire respectively know whether or not a mobile device is reachable, when the responsible MME tries to deliver a message to the mobile device. If the responsible MME then informs all other entities of the mobile communication network about the reachability of the mobile device, it will generate massive signaling load in the mobile communication network, in particular in its core network given the fact that several million of mobile devices may be served by the network.

Huge amount of signaling in the mobile communication network increases significantly the operational costs of the mobile communication network. The invention has got the advantage to reduce the signaling load in the mobile communication network to a minimum for the delivery of messages to mobile devices, which are stationary devices.

According to the invention, the movement information element can be transmitted from a mobile device advantageously to a database, for instance a subscriber database like the HLR respectively HSS of a mobile communication network or to the responsible MME. The Transmission of the movement information element can be done during an attach request of the mobile device during the initial connection respectively attach to the mobile communication network, or during a tracking area update, which is transmitted from the mobile device to the database. The received movement information element of the mobile device can be stored advantageously in a database or the like of the responsible MME or in a database to which the responsible MME has access to. Furthermore, the transmitted movement information element can be stored in a database of the mobile communication network, preferably in a database comprising subscriber information of the mobile communication network like the HLR or the HSS.

If the transmitted movement information element of the mobile device is stored by a database, wherein the database comprises subscriber information of subscribers of the mobile communication network, the inventive solution is centralized in the mobile communication network. The movement information element is accessible by all entities of the mobile communication network, or can be transmitted to each responsible MME, via which a stationary mobile device has access to the mobile communication network. If, however, the transmitted movement information element of a mobile device is stored in a responsible MME, the inventive solution is decentralized due to the fact that initially only the movement information element is available at this responsible MME. Both solutions solve the inventive technical object of the invention by reducing the signaling load in a mobile communication network, which is caused by delivering a message to a mobile device in the mobile communication network.

In a further embodiment of the invention the switch center stores the movement information element of the mobile device in a database of the switch center together with the responsible MME upon receiving the movement information element. The movement information element is preferably stored together with the responsible MME, via which the stationary mobile device has access to the mobile communication network. By storing the movement information element it is accessible for further messages, which messages have the mobile device as the recipient so that the acquiring of routing information needed by sending an interrogation request to the subscriber database of the mobile communication network is not necessary for instance for subsequent messages. Furthermore, by storing the movement information element there is no need to acquire this information from the subscriber database of the mobile communication network. In the case of a request received by the switch center to re-deliver the message, the storing of the movement information element advantageously enables the switch center to ignore this request since the message is already stored by the responsible MME and is delivered to the mobile device from this responsible MME upon the mobile device waking up.

In another embodiment of the invention the movement information element is stored by the responsible MME upon receiving the movement information element. If the inventive solution is centralized at a subscriber database of a mobile communication network, the movement information element may be received for the first time by the responsible MME when the message to be delivered to the stationary mobile device is forwarded from the switch center to the responsible MME together with the information movement element. The information movement element is stored by the responsible MME for future cases to deliver a message to the stationary mobile device and for cases wherein the responsible MME receives a message to be delivered to the mobile device and already knows that the mobile device is not reachable. If this mobile device, which is not reachable, is additionally a stationary device, the responsible MME stores the message to be delivered to the stationary mobile device and delivers the stored message upon the wake up of the mobile device.

A preferred embodiment of the invention is characterized in that if the mobile device is not reachable the responsible mobility management entity sends a response, preferably an information element indicating that the mobile device is not reachable to the switch center, wherein upon reception of the response the switch center sets a timer indicating the time after which the mobile device is reachable, wherein preferably the switch center stores the timer in a database of the switch center, preferably together with the message, the responsible mobility management entity and the movement information element of the mobile device. The timer is in particular for the case of a re-deliver of the message for instance requested by a service center of the mobile device so that the signaling load in the mobile network can be reduced in this case as well. Furthermore, the use of a timer in the switch center is reasonable if the stationary mobile device is not reachable and a further message to be delivered to the mobile device is received by the switch center. The timer can be implemented by using a time stamp, advantageously indicating that the mobile device is not reachable for a certain amount of time, for instance the mobile device is not reachable for the next eight hours or the like.

In a further embodiment of the invention upon receipt of a further message to be delivered to the mobile device at the switch center of the mobile communication network, the further message is forwarded to the responsible MME after the expiration of the timer. If a further message to be delivered to the mobile device, which is a stationary device is received by the switch center, advantageously the switch center additionally checks, if a timer for the mobile device to which the message should be delivered is set, during which the mobile device is not reachable and if this is true, the switch center does not forward the message to the responsible MME, since the mobile device is not reachable. Instead, it may store the message to be delivered and forward the message after the expiration of the timer due to the fact that the mobile device is very likely reachable after the expiration of the timer so that the message can be delivered after forwarding it to the responsible MME from the responsible MME to the mobile device instantly. If, however, a request for the re-delivery of the message is received by the switch center, for instance which request for the re-delivery was sent by a service center of the mobile communication network, the switch center executes a further method step by checking upon receiving of the message if the message is the same message, advantageously at least a message identification element is stored in advance by the switch center, for instance upon receiving a message to be delivered initially, and checking if a timer is set indicating that the mobile device is not reachable, and if both conditions are true, disregarding the message by the switch center since the message to be delivered is already stored by the responsible MME, so that the message is delivered from the responsible MME to the mobile device upon the mobile device exiting sleep mode respectively waking up.

Another embodiment of the inventive solution is characterized in that the mobile device sends a reachability indicator to the respective MME shortly before entering or upon leaving a sleep mode, wherein the reachability indicator contains a reachability information element indicating if the mobile device is reachable, and wherein the responsible MME stores the received reachability information element. By storing a reachability information element of the mobile device the responsible MME does not need to try to deliver the message to the mobile device if a checking of the reachability information element upon the reception of a message forwarded by the switch center to the responsible MME is done, and the checking leads to the result that the mobile device is not reachable. In this case, the message to be delivered is stored by the responsible MME and is delivered upon the mobile device waking up. The method step of checking by the responsible MME can be advantageously enhanced by this aforementioned feature.

An embodiment of the invention is characterized in that upon receiving the interrogation request the database of the mobile communication network, in particular the subscriber database, transmits routing information needed for the delivery of the message and, if available, the movement information element indicating if the mobile device is a stationary device from the database to the mobile device. The routing information preferably indicates which MME of the mobile communication network is responsible for the mobile device, which is the recipient of the message to be delivered. The responsible MME is known by the database due to the fact that during an initial attachment of the mobile device to the communication network the MME transmits information indicating that the mobile device is within the control of this responsible MME. Furthermore, during a location update this information indicating the responsible MME is transmitted to the subscriber database of the mobile communication network as well.

As a further technical solution the invention proposes a switch center for delivering of a message to a mobile device in a mobile communication network, comprising
  means for receiving a message to be delivered to a mobile device;
  means for checking if a responsible mobility management entity for the delivery of the message is known;
  means for sending an interrogation request for acquiring the responsible mobility management entity and, if available movement information element indicating if the mobile device is a stationary device from a database of the mobile communication network; and
  means for forwarding the message to the responsible mobility management entity together with the movement information element of the mobile device.

In an embodiment of the invention the switch center further comprises means for storing movement information element indicating if the mobile device is a stationary device in a database, preferably together with the responsible mobility management entity.

In another embodiment of the invention the switch center further comprises means for receiving a timer from a responsible mobility management entity.

Advantageously, the switch center is equipped and/or adapted to execute the method steps regarding the switch center according to the inventive method.

As a further technical solution the invention proposes a mobility management entity (MME) for delivering a message to a mobile device in a mobile communication network, comprising:
  means for receiving a message to be delivered to a mobile device;
  means for checking if a movement information element is available;
  means for acquiring movement information element of the mobile device;
  means for checking if the mobile device is reachable;
  means for storing an information indicating if the mobile device is a stationary device; and
  means for delivery of the message to the mobile device.

An embodiment of the invention is characterized in that the mobility management entity further comprises means for storing the message to be delivered to the mobile device and/or for storing a reachability information indicating if the mobile device is reachable, and/or means for sending a response indicating if the mobile device is reachable to the switch center.

Preferably, the mobility management entity is equipped and/or adapted to execute the method steps regarding the mobility management entity according to the inventive method.

As a further technical solution the invention proposes a mobile device for receiving a message in a mobile communication network, comprising:
  means for sending a registration request to a database of the mobile communication network, wherein indicating the request contains movement information element indicating if the mobile device is stationary; and
  means for receiving a message from the mobility management entity of the mobile communication network.

In an embodiment of the invention the mobile device further comprises means for sending a request to a mobility management entity of the mobile communication network, in which coverage area the mobile device is located, wherein the request contains reachability information indicating the reachability of the mobile device and/or means for entering a sleep mode.

An embodiment of the invention is characterized in that the mobile device is equipped and/or adapted to execute the method steps regarding the mobile device according to the inventive method.

As a further technical solution the invention proposes a database of a mobile communication network, comprising:
  means for receiving a movement information element indicating if the mobile device is a stationary device from a mobile device;
  means for storing an information;
  means for receiving an interrogation request from a switch center; and
  means for sending a response on the received interrogation request, wherein the response contains information regarding a responsible mobility management entity and/or movement information element indicating if the mobile device is a stationary device.

Preferably, the database can be a database of a mobile communication network comprising subscriber information of subscribers of the mobile communication network, for instance a so called HLR (HLR: Home Location Register), HSS (HSS: Home Subscriber Server), VLR (VLR: Visitor Location Register).

Advantageously, the database is equipped and/or adapted to execute the method steps regarding the database according to the inventive method.

In another aspect of the invention the object is solved by a system for delivery a message to a mobile device in a mobile communication network, comprising:
  an inventive switch center;
  an inventive mobility management entity;
  an inventive mobile device; and
  an inventive database;
wherein preferably each of the aforementioned entities of the system is equipped and/or adapted to execute the inventive method steps regarding said entity.

BRIEF DESCRIPTION OF THE DRAWINGS

Other details, characteristics and advantages of the invention will be explained in detail in the following by means of the exemplary embodiments represented in the figures.

DETAILED DESCRIPTION

Figure 1:
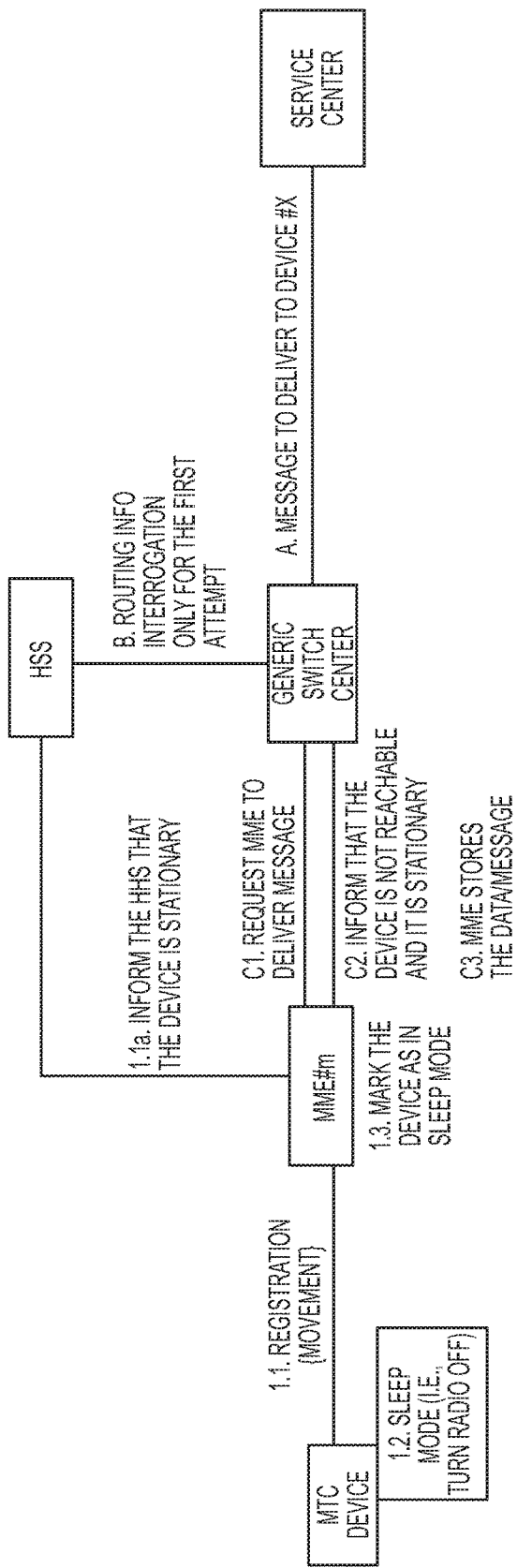
FIG. 1 shows a schematic diagram of entities of a mobile communication network used in a first embodiment according to the invention for delivering a message to a mobile device in a mobile communication network.

FIG. 1 shows a schematic diagram of entities of a mobile communication network, which are used in a first embodiment according to the invention to execute an inventive method for delivering a message to a mobile device in the mobile communication network.

In a first step of the embodiment according to FIG. 1, a movement information element indicating if the mobile device MTC is a stationary device—in FIG. 1 referred to as {movement}—is received and stored by a responsible mobility management entity MME#m of the mobile communication network, via which responsible mobility management entity MME#m the mobile device MTC has access to the mobile communication network. The addition "#m" refers to a specific name or address of that responsible mobility management entity MME#m, which is uniquely identifiable by that name or address. This method step is represented by the two arrows with the reference numerals 1.1 and 1.1a.

The movement information element can be transmitted from the mobile device MTC via the responsible mobility management entity MME#m to a database HSS of the mobile communication network, wherein the database HSS comprises subscriber information of subscribers of the mobile communication network, also referred to as subscriber database. The mobile device MTC sends the movement information element for instance during an initial attach procedure to the database HSS or during a tracking area update.

The next step of the embodiment of the invention is shown by reference numeral A, wherein a message, also referred to as mobile terminated message (MT message), to be delivered to the mobile device MTC is received by a switch center of the mobile communication network, in FIG. 1 referred to as Generic Switch Center (GMSC).

After receiving the message in a next step the switch center GMSC checks if the responsible mobility management entity MME#m is known by the switch center GMSC. For instance, the responsible mobility management entity MME#m can be known by the switch center GMSC if another message was already delivered to the mobile device MTC. A movement information element indicating that the mobile device MTC is a stationary device allows for the knowledge that the mobile device MTC does not change its responsible mobility management entity via which the mobile device MTC has access to the mobile communication network. Furthermore, the switch center GMSC may have already stored the responsible mobility management entity MME#m via which the received message by the switch center GMSC can be delivered to the mobile device MTC so that this information is known by the switch center GMSC as well.

If the responsible mobility management entity MME#m is known by the switch center GMSC the received MT message is forwarded together with the movement information element, if the movement information element is available at the switch center GMSC, to the responsible mobility management entity MME#m.

If the responsible mobility management entity MME#m is unknown by the switch center GMSC, the switch center GMSC sends an interrogation request to the database HSS to acquire the responsible mobility management entity MME#m, and acquiring the movement information element of the mobile device MTC if the movement information element is available at the database HSS. This method step is marked by reference numeral B in FIG. 1. If the movement information element is available at the switch center GMSC and the movement information element indicates that the mobile device MTC is a stationary device, the switch center GMSC stores the movement information element preferably together with the responsible mobility management entity MME#m of the mobile device MTC. According to the invention this ensures that the responsible mobility management entity MME#m—acquired a routing information interrogation—has to be acquired from the database HSS by the switch center GMSC only for the first attempt. Due to the fact that the mobile device MTC is a stationary device, it does not change its responsible mobility management entity MME#m via which it has access to the mobile communication network.

The switch center GMSC advantageously has a new functionality, wherein the movement information element is stored by the switch center. For instance, this movement information element may be stored in the following notation: {Movement [stationary] Registered MME [MME address/Name] Time Stamp}, wherein the term "Registered MME" is herein also used as "responsible MME". The term [MME address/name] can refer to a specific address or name so that data and/or information can be sent from an entity of a mobile communication network to this specific MME.

According to the features of the invention the method step of acquiring the responsible mobility management entity MME#m—in FIG. 1 represented by step B—is only needed for the first attempt and not needed for the subsequent attempts and thus reduces signaling load towards the database HSS. Given the oversubscription of M2M device in a mobile communication network, which are all stationary mobile device like the mobile device MTC of FIG. 1, this signaling reduction in the database HSS is very desirable.

After acquiring the responsible mobility management entity MME#m by the switch center GMSC, preferably together with the movement information element, the switch center GMSC forwards the message and the movement information element, if the movement information element is available at the switch center GMSC, to the responsible mobility management entity MME#m. These features and/or method steps of the embodiment of the invention are represented by reference numerals C1 and C2 in FIG. 1.

The forwarded message is received by the responsible mobility management entity MME#m. Furthermore, the movement information element may be received by the responsible mobility management entity if this movement information element was forwarded by the switch center GMSC.

After receiving the message, the responsible mobility management entity MME#m checks if the movement information element is available at the responsible mobility management entity MME#m, for instance the movement information element can be forwarded by the switch center to the responsible mobility management entity MME#m and/or the movement information element of the mobile device MTC can be stored by the responsible mobility management entity MME#m when the movement information element was transmitted from the mobile device MTC during an initial attach request and/or an tracking area update and/or location area update of the mobile device MTC.

If the movement information element is not available at the responsible mobility management entity MME#m, the movement information element is acquired by the responsible mobility management entity MME#m, for instance if the movement information element was only received and stored by the responsible mobility management entity MME#m during an initial attach request and/or an tracking area update and/or location area update. After acquiring the movement information element, the movement information element is transmitted back to the switch center GMSC because in this case it is very likely that the switch center GMSC does not possess the movement information element and it can be useful for a subsequent message received by the switch center GMSC to be delivered to the mobile device MTC.

Advantageously, the responsible mobility management entity MME#m stores the data like the movement information element. This is represented by method step with the reference numeral C3 in FIG. 1.

To deliver the message from the responsible mobility management entity MME#m to the mobile device MTC, advantageously the responsible mobility management entity MME#m can try to deliver the message instantly. The message can be delivered if the mobile device MTC is reachable.

If the mobile device MTC is not reachable and the mobile device MTC is a stationary device, for instance this is known by the responsible mobility management entity MME#m due to the movement information element of the mobile device MTC, the message is stored by the responsible mobility management entity MME#m and the stored message is delivered from the responsible mobility management entity MME#m to the mobile device MTC upon the mobile device MTC waking up.

The feature of storing the message by the responsible mobility management entity MME#m is marked in FIG. 1 by the reference numeral C3.

The mobile device MTC may be not reachable by the responsible mobility management entity MME#m if the mobile device MTC has entered for instance a sleep mode. If the mobile device MTC is in sleep mode, the mobile device MTC has turned off its radio. To save battery power, the mobile device MTC can enter the sleep mode for instance after transmitting a movement information element—also referred to as reachability indicator—to an entity of the mobile communication network. In FIG. 1, this aforementioned feature is shown by the reference numeral 2. The mobile device MTC can send another information element indicating the reachability of the mobile device MTC to the responsible mobility management entity MME#m before the mobile device MTC enters the sleep mode. After receiving such an information element of the mobile device MTC indicating the reachability of the mobile device MTC, the responsible mobility management entity can mark the mobile device MTC as being in sleep mode and/or the mobile device MTC being not reachable. On receiving a message to be delivered to the mobile device by the responsible mobility management entity MME#m from the switch center GMSC, the responsible mobility management entity can check whether or not the mobile device is reachable so that a try to deliver the message to the mobile device MTC if the mobile device MTC is not reachable can be avoided by the responsible mobility management entity MME#m. In this case, the received message to be delivered to the mobile device MTC can be stored immediately by the responsible mobility management entity MME#m, if the mobile device, which is the recipient of the message, is a stationary device, as indicated in FIG. 1 by reference numeral C3.

Figure 2:
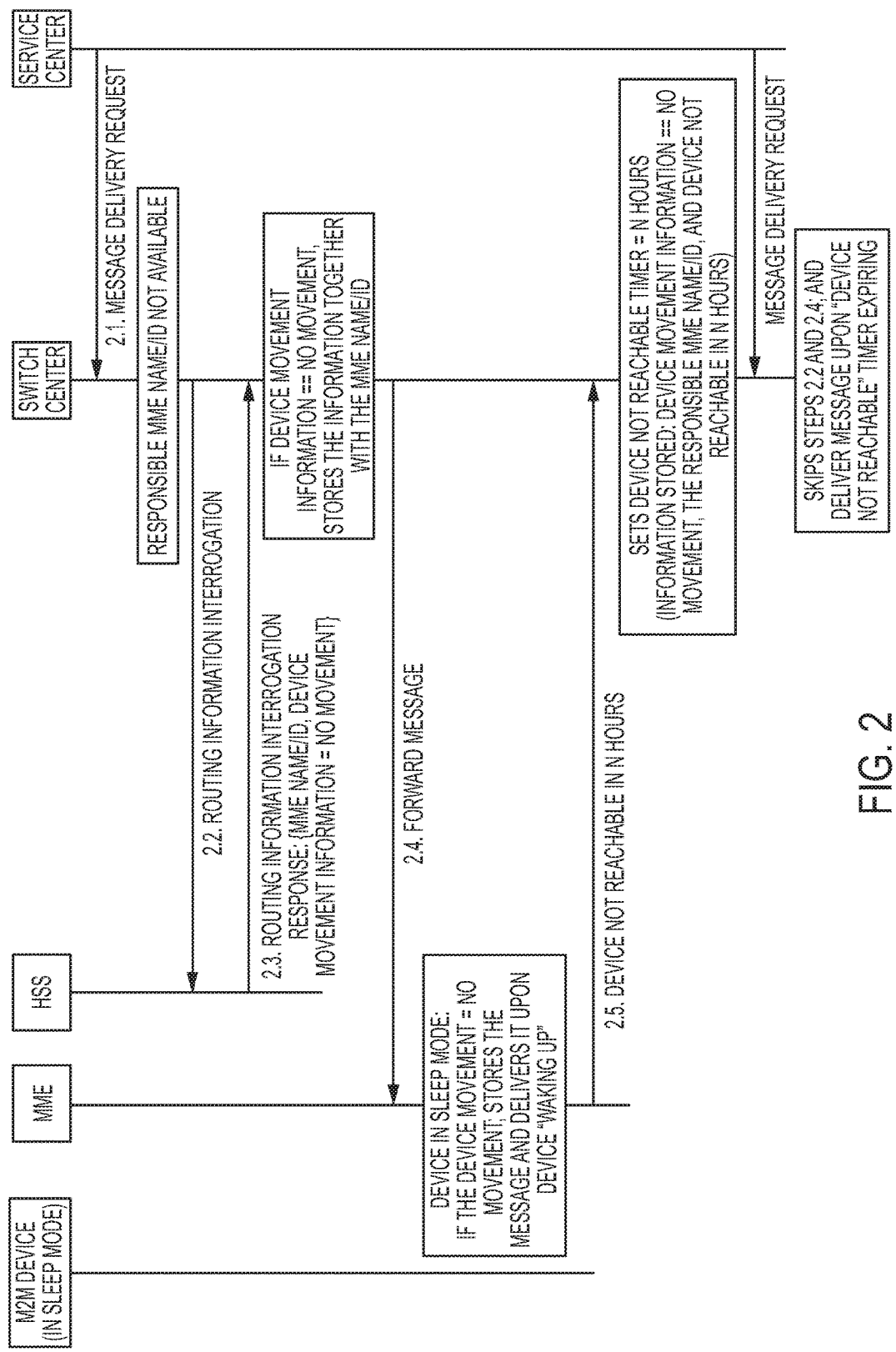
FIG. 2 shows a schematic procedure of an embodiment of an inventive method for delivering a message to a mobile device.

FIG. 2 shows a schematic procedure of an embodiment of the invention of a method for delivering a message to a mobile device.

A message to be delivered is received by a switch center of a mobile communication network from a service center of the mobile communication network at step 2.1. The switch center checks whether the responsible mobility management entity is known by the switch center, in FIG. 3 the case is given that the responsible mobility management entity is not known by the switch center and therefore not available at the switch center.

In step 2.2, an interrogation request is sent from the switch center to a database of the mobile communication network, wherein the database is at present the HSS of the mobile communication network. At present, the interrogation request is for acquiring routing information, so that the request is called routing information interrogation in step 2.2.

In step 2.3, the database HSS of the mobile communication network response to the interrogation request of step 2.2 and transmits at present the responsible mobility management entity MME as well as movement information of a mobile device, at present a M2M device, which has already entered a sleep mode to save battery power. The aforementioned information respectively information element are referred to as "Routing information interrogation response" comprising the responsible mobility management entity and a movement information element of the mobile device to which the message should be delivered.

After acquiring the responsible mobility management entity MME, the switch center stores the acquired information respectively information element together with the responsible mobility management entity MME, if the movement information element indicates that the mobile device, which is the recipient of the message to be delivered, is a stationary device.

The message is forwarded to the responsible mobility management entity MME in step 2.4.

Upon receiving the forwarded message by the responsible mobility management entity MME, the responsible mobility management entity MME checks if the movement information element of the mobile device is available at the responsible mobility management entity MME. At present, the movement information element was forwarded by the switch center to the responsible mobility management entity MME.

As described above, the mobile device has already entered a sleep mode and is not reachable by the responsible mobility management entity MME. The mobile device has therefore sent a reachability indicator to the responsible mobility management entity MME shortly before entering or upon leaving a sleep mode, wherein the reachability indicator contains a reachability information element indicating that the mobile device is in the sleep mode. The responsible mobility management entity MME has stored the received reachability information element.

The movement information element is available at the responsible mobility management entity MME, therefore the responsible mobility management entity MME knows that the message cannot be delivered to the mobile device currently. Because the mobile device is not reachable and the mobile device is a stationary device, the responsible mobility management entity MME stores the message and delivers the stored message upon the mobile device waking up. The message is delivered from the responsible mobility management entity MME to the mobile device, when the mobile device notifies the responsible mobility management entity MME that is has exited the sleep mode and is reachable again.

At present, the mobile device is in the sleep mode, so that the mobile device is not reachable. According to the embodiment of the invention, in step 2.5 the responsible mobility management entity MME sends a response, for instance device not reachable, to the switch center, wherein upon reception of the response (device not reachable) the switch center GMSC sets a timer indicating the time after which the mobile device MTC is reachable, wherein preferably the switch center stores the timer in a database of the switch center, preferably together with the message, the responsible mobility management entity MME and the movement information element of the mobile device. The present embodiment stores all the aforementioned information respectively data as it is indicated by the box shown at the switch center after method step 2.5.

In FIG. 2, at the bottom of the shown procedure, a further message delivery request is received by the switch center originating from the service center. This message delivery request may be another message to be delivered to the mobile device or the same message, which was already received at least once at the switch center so that the received message by the switch center can be a retry respectively re-delivery request of the message.

The further message is forwarded to the responsible mobility management entity MME after the expiration of the timer. Advantageously, if the timer indicates that the mobile device to which the message should be delivered is not reachable, the switch center can store the message and deliver the message upon the mobile device waking up, for instance when the mobile device exits the sleep mode.

At this subsequent reception of a further message respectively a retry to deliver a message, method step 2.2 can be skipped since the information respectively data needed for delivering the message is already known by the switch center. At present, the switch center knows the responsible mobility management entity MME and the movement information element of the mobile device indicating that the mobile device is a stationary device. This reduces the signaling load in particular in the core network of the mobile communication network by requiring to get the responsible mobility management entity MME and the movement information element of the mobile device only once. For subsequent messages the need to send an interrogation request from the switch center to a database comprising subscriber information, at present the HSS, is therefore obsolete.

Furthermore, method step 2.4 can be skipped if the timer indicates that the mobile device is not reachable. The message is then stored by the switch center and forwarded to the responsible mobility management entity MME upon "device not reachable" timer expiring. This reduces the signaling load furthermore, because the message is only forwarded to the responsible mobility management entity MME if the mobile device, which is the recipient of the message, is reachable.

Figure 3:
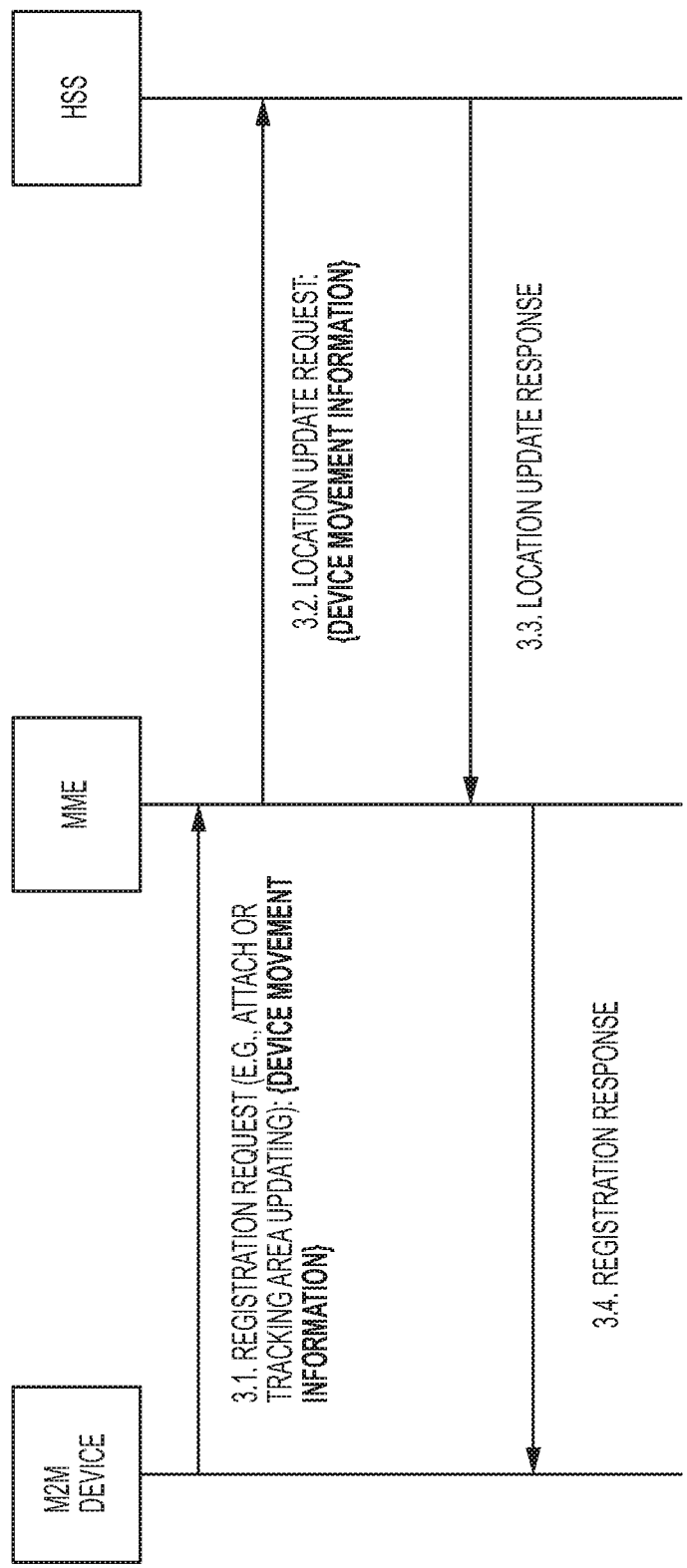
FIG. 3 shows a schematic procedure of an embodiment of an inventive method, wherein the schematic procedure shows the transmission of a movement information element from a mobile device to an entity of a mobile communication network.

FIG. 3 shows a schematic procedure of an embodiment of an inventive method, wherein the schematic procedure shows the transmission of a movement information element from a mobile device to an entity of a mobile communication network.

In FIG. 3 the mobile device MTC is referred to as M2M device, which is a stationary mobile device in the sense of the invention. A movement information element can be transmitted from the mobile device MTC advantageously to a database, for instance a subscriber like the HLR respectively HSS of a mobile communication network or to the responsible mobility management entity MME. The Transmission of the movement information element can be done during an attach request of the mobile device during the initial connection respectively attach to the mobile communication network, or during a tracking area update respectively location area update, which is transmitted from the mobile device MTC to the database. In FIG. 3, it is referred to the transmission of the movement information element as sending a registration request, shown by reference numerals 3.1 and 3.2. The received movement information element of the mobile device can be stored advantageously in a database or the like of the responsible mobility management entity MME or in a database to which the responsible mobility management entity MME has access. Furthermore, the transmitted movement information element can be stored in a database, preferably in a database comprising subscriber information of the mobile communication network like the HLR or the HSS.

If the transmitted movement information element of the mobile device is stored by the database HSS, the inventive solution is centralized in the mobile communication network. The movement information element is accessible by all entities of the mobile communication network, or can be transmitted to each responsible mobility management entity MME, via which a stationary mobile device MTC has access to the mobile communication network. If, however, the transmitted movement information element of the mobile device MTC is stored in the responsible mobility management entity MME, the inventive solution is decentralized due to the fact that initially only the movement information element is initially only available at this responsible MME. Both solve the inventive technical object of the invention by reducing the signaling load in a mobile communication network, which is caused by delivering a message to a mobile device in the mobile communication network.

In FIG. 3 the movement information element is transmitted via the responsible mobility management entity MME to the database HSS. For instance, during a location area update or an attach request according to which the database HSS stores the responsible mobility management entity MME of the mobile device MTC, according to the invention the database HSS stores additionally the movement information element of the mobile device MTC. A response that the movement information element was successfully transmitted from the mobile device MTC to the database HSS is advantageously transmitted from the database HSS via the responsible mobility management entity MME to the mobile device MTC. In FIG. 3 this feature respectively method step are shown by the reference numerals 3.3 and 3.4.

The exemplary embodiments of the invention represented in the figures and described in connection with these only serve for explaining of the invention and are not limiting for the invention.

REFERENCE NUMERALS

MTC Machine Type Communication Device; mobile device
HSS Home Subscriber Server; database
GSMC Generic Switch Center; switch center
MME Mobility Management Entity
MME#m responsible Mobility Management Entity
MT message Mobile Terminated Message; message
1.1 method step
1.1a method step
1.2 method step
1.3 method step
2.1 method step
2.2 method step
2.3 method step
2.4 method step
3.1 method step
3.2 method step
3.3 method step
3.4 method step
3.5 method step
A method step
B method step
C1 method step
C2 method step
C3 method step

The invention claimed is:

1. A method for delivering a message to a mobile device in a mobile communication network, comprising the following method steps:

receiving and storing a movement information element indicating if the mobile device (MTC) is a stationary device by a responsible mobility management entity (MME) of the mobile communication network, via which the mobile device (MTC) has access to the mobile communication network and/or by a database (HLR/HSS) of the mobile communication network, wherein the database (HLR/HSS) comprises subscriber information of subscribers of the mobile communication network;

receiving a message (MT message) to be delivered to the mobile device (MTC) at a switch center (GMSC) of the mobile communication network;

checking if the responsible mobility management entity (MME) is known by the switch center (GMSC); and if the responsible mobility management entity (MME) is known forwarding the received message (MT message) together with the movement information element, if the movement information element is available at the switch center (GMSC), to the responsible mobility management entity (MME);

if the responsible mobility management entity (MME) is unknown by the switch center (GMSC), sending an interrogation request from the switch center (GMSC) to the database (HLR/HSS) to acquire the responsible mobility management entity (MME), and acquiring the movement information element of the mobile device (MTC) if the movement information element is available at the database (HLR/HSS);

after acquiring the responsible mobility management entity (MME), preferably together with the movement information element, forwarding the message (MT message) and the movement information element, if the movement information element is available at the switch center (GMSC), from the switch center (GMSC) to the responsible mobility management entity (MME);

receiving the forwarded message (MT message) and, if forwarded by the switch center (GMSC), the movement information element at the responsible mobility management entity (MME);

checking if the movement information element is available at the responsible mobility management entity (MME), and if the movement information element is not available at the responsible mobility management entity (MME) acquiring the movement information element by the responsible mobility management entity (MME) and after acquiring the movement information element transmitting the movement information element to the switch center (GMSC); and delivering the message (MT message) from the responsible mobility management entity (MME) to the mobile device (MTC) if the mobile device is reachable or, if the mobile device (MTC) is not reachable and the mobile device (MTC) is a stationary device, storing the message (MT message) by the responsible mobility management entity (MME) and delivering the stored message upon the mobile device (MTC) is waking up from the responsible mobility management entity (MME) to the mobile device (MTC).

2. The method according to claim 1, wherein the switch center (GMSC) stores the movement information element of the mobile device (MTC) in a database of the switch center (GMSC) together with the responsible mobility management entity (MME) upon receiving the movement information element.

3. The method according to claim 1, wherein the movement information element is stored by the responsible mobility management entity (MME) upon receiving the movement information element.

4. The method according to claim 1, wherein if the mobile device (MTC) is not reachable the responsible mobility management entity (MME) sends a response (device not reachable) to the switch center (GMSC), wherein upon reception of the response (device not reachable) the switch center (GMSC) sets a timer indicating the time after which the mobile device (MTC) is reachable.

5. The method according to claim 4, wherein the switch center (GMSC) stores the timer in a database of the switch center (GMSC).

6. The method according to claim 5, wherein the switch center (GMSC) stores the timer in the database together with the message (MT message), the responsible mobility management entity (MME) and the movement information element of the mobile device (MTC).

7. The method according to claim 4, wherein upon receipt of a further message (MT message 2) to be delivered to the mobile device (MTC) at the switch center (GMSC) of the mobile communication network, the further message (MT message 2) is forwarded to the responsible mobility management entity (MME) after the expiration of the timer.

8. The method according to claim 1, wherein the mobile device (MTC) sends a reachability indicator to the responsible mobility management entity (MME) shortly before entering or upon leaving a sleep mode, wherein the reachability indicator contains a reachability information element indicating if the mobile device (MTC) is reachable, and wherein the responsible mobility management entity (MME) stores the received reachability information element (device reachability information).

9. The method according to claim 1, wherein upon receiving the interrogation request the database (HLR/HSS) of the mobile communication network transmits routing information needed for the delivery of the message (MT message)

and, if available, the movement information element indicating if the mobile device (MTC) is a stationary device from the database (HLR/HSS) to the mobile device (MTC).

\* \* \* \* \*